United States Patent
Mutangana et al.

(10) Patent No.: US 12,483,293 B2
(45) Date of Patent: Nov. 25, 2025

(54) SELF-OPTIMIZING ON-VEHICLE NETWORK

(71) Applicant: Ford Global Technologies, LLC, Dearborn, MI (US)

(72) Inventors: Jean de Dieu Mutangana, Detroit, MI (US); Ivan Vukovic, Birmingham, MI (US); Nicholas Alexander Scheufler, Flat Rock, MI (US); Sathyanarayana Chary Palakonda, Northville, MI (US); John Eric Rollinger, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 126 days.

(21) Appl. No.: 18/435,363

(22) Filed: Feb. 7, 2024

(65) Prior Publication Data
US 2025/0253888 A1   Aug. 7, 2025

(51) Int. Cl.
*H04B 1/719* (2011.01)
*H04B 1/3822* (2015.01)
*H04W 24/02* (2009.01)

(52) U.S. Cl.
CPC .......... *H04B 1/719* (2013.01); *H04B 1/3822* (2013.01); *H04W 24/02* (2013.01)

(58) Field of Classification Search
CPC ...... H04B 1/719; H04B 1/3822; H04W 24/02
See application file for complete search history.

(56) References Cited

U.S. PATENT DOCUMENTS

| | | |
|---|---|---|
| 7,474,705 B2 | 1/2009 | Shor et al. |
| 8,305,936 B2 | 11/2012 | Wang |
| 8,379,736 B2 | 2/2013 | Santhoff et al. |
| 2021/0166508 A1* | 6/2021 | Ziller ............... B60R 25/00 |
| 2021/0211327 A1* | 7/2021 | Tertinek ........... H04L 25/0212 |
| 2021/0311478 A1 | 10/2021 | Pierfelice |
| 2023/0341499 A1* | 10/2023 | Chen ................. G01S 5/02 |
| 2024/0012090 A1* | 1/2024 | Cherukuri ......... G01S 5/0264 |

FOREIGN PATENT DOCUMENTS

DE     102021204374 A1    11/2022

* cited by examiner

*Primary Examiner* — Sam K Ahn
*Assistant Examiner* — Amneet Singh
(74) *Attorney, Agent, or Firm* — Joseph Zane; Brooks Kushman P.C.

(57) ABSTRACT

Self-optimization of an ultra-wideband (UWB) network is performed. A configuration of UWB anchors of a vehicle is identified. A state vector is constructed based on the identified configuration, the state vector including values for status and ranging quality indicators for each of the UWB anchors. A next state is predicted based on the state vector using reinforcement learning to optimize UWB coverage, wherein a conditional probability of the next state depends only on the state vector. Unified configuration interface (UCI) commands are sent to the UWB anchors to reconfigure the UWB anchors based on the predicted next state.

20 Claims, 9 Drawing Sheets

SELF-OPTIMIZING ON-VEHICLE NETWORK

TECHNICAL FIELD

Aspects of the disclosure relate to a self-optimizing network of on-vehicle sensors, the self-optimizing including self-healing and self-configuration of the sensors.

BACKGROUND

Some vehicles may be unlocked or started with a digital key. A digital key, sometimes implemented with a smartphone or the like, relies on communication between a mobile device such as a smartphone and the vehicle. When an application is activated on the mobile device and the mobile device is held at a particular location relative to the vehicle, such as next to the door handle, the vehicle unlocks the doors. A digital key may communicate with the vehicle using Bluetooth®, near field communication (NFC), and/or ultra-wideband (UWB).

SUMMARY

In one or more illustrative examples, a method for performing self-optimization of a UWB network is performed. A configuration of UWB anchors of a vehicle is identified. A state vector is constructed based on the identified configuration, the state vector including values for status and ranging quality indicators for each of the UWB anchors. A next state is predicted based on the state vector using reinforcement learning to optimize UWB coverage, wherein a conditional probability of the next state depends only on the state vector. Unified configuration interface (UCI) commands are sent to the UWB anchors to reconfigure the UWB anchors based on the predicted next state.

In one or more illustrative examples, a system for performing self-optimization of an UWB network, includes one or more computing devices configured to identify a configuration of UWB anchors of a vehicle; construct a state vector based on the identified configuration, the state vector including values for status and ranging quality indicators for each of the UWB anchors; predict a next state based on the state vector using reinforcement learning to optimize UWB coverage, wherein a conditional probability of the next state depends only on the state vector; and send UCI commands to the UWB anchors to reconfigure the UWB anchors based on the predicted next state.

In one or more illustrative examples, a non-transitory computer-readable medium comprising instructions for performing self-optimization of an UWB network that, when executed by one or more computing devices, cause the one or more computing devices to perform operations including to identify a configuration of UWB anchors of a vehicle; construct a state vector based on the identified configuration, the state vector including values for status and ranging quality indicators for each of the UWB anchors; predict a next state based on the state vector using reinforcement learning to optimize UWB coverage, wherein a conditional probability of the next state depends only on the state vector; and send UCI commands to the UWB anchors to reconfigure the UWB anchors based on the predicted next state.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Features of the vehicle may rely on the relative location of a mobile device, e.g., digital key, remote park assist, smart tool, etc., in relation to the location of the vehicle. The controller of the vehicle may perform trilateration to determine the location of the mobile device. This may be performed using UWB anchors in communication with the mobile device, which also may be equipped with an UWB transceiver. The controller uses the UWB anchors to determine distance data, which may include distances between the mobile device and the respective UWB anchors, e.g., based on time of flight (TOF) data between the mobile device and the UWB anchors. The trilateration can be performed using at least three TOF distances. Once the location of the mobile device is determined, the controller may actuate a vehicle component according to one of the features, e.g., unlocking the doors for the digital key or operating the vehicle for the remote park assist.

The UWB anchors may be placed inside and on the vehicle body. However, different vehicles come in different sizes and shapes. Due to this variation, pinpointing an appropriate position to place each anchor to provide signal coverage is difficult. In some cases, one or more of the UWB responders becomes non-functional, further complicating detection of the user device.

A self-calibrating network of on-vehicle ultrawideband responders for user localization and smart vehicle access may be implemented to continuously optimize the UWB network coverage for localization. The self-calibrating network may autonomously tune and manage the radio frequency (RF) resource parameters of the UWB anchors. Further aspects of the disclosure are discussed in detail herein.

Figure 1:
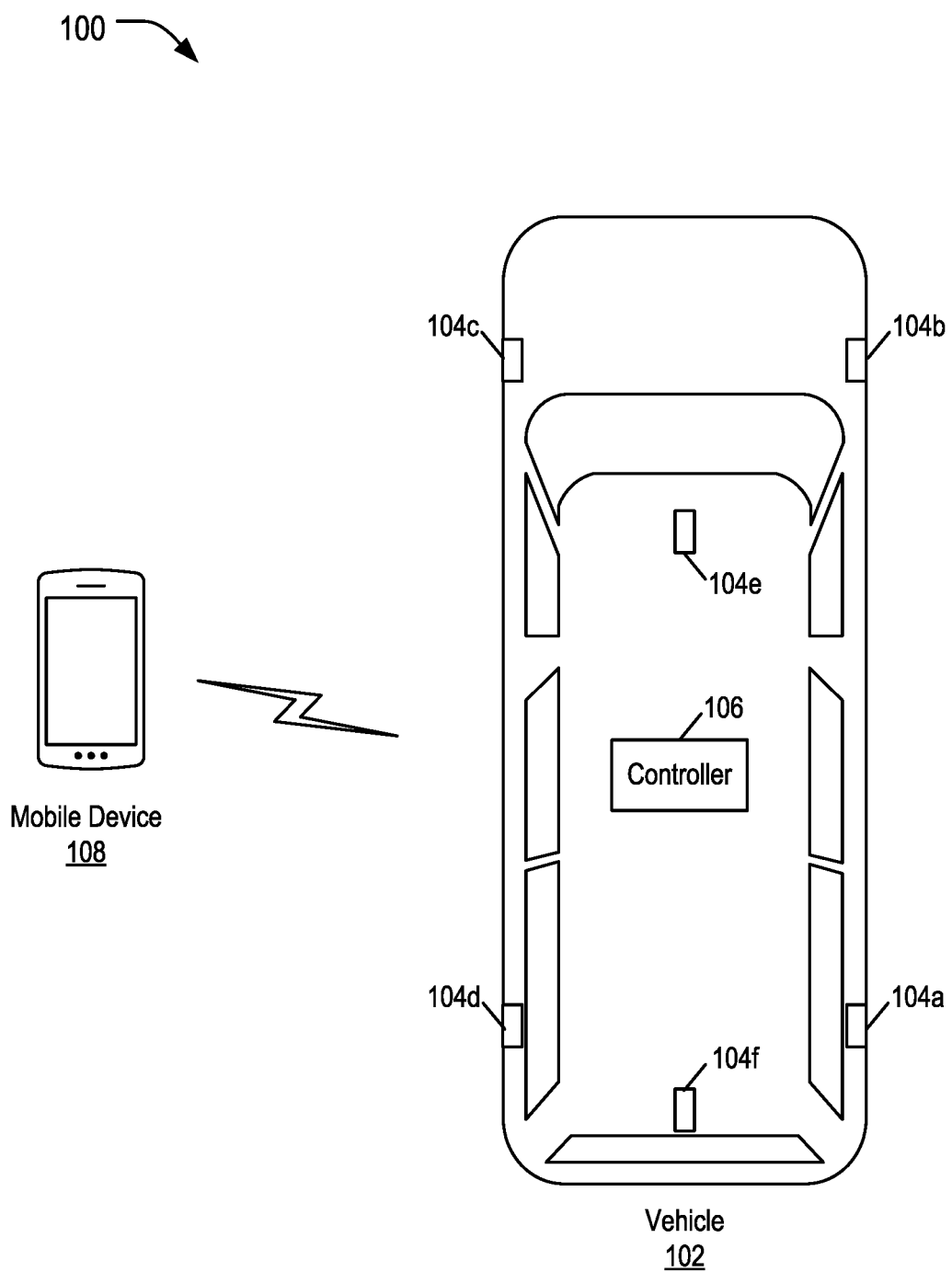
FIG. 1 illustrates an example system including a vehicle implementing a self-optimizing network of UWB anchors.

FIG. 1 illustrates an example system 100 including a vehicle 102 implementing a self-optimizing network of UWB anchors 104. As shown, the vehicle 102 includes a plurality of UWB anchors 104 and a controller 106 in communication with one another. The system 100 may be used to track the position of mobile devices 108. Thes mobile devices 108 may include smartphones, smart tools, smart watches, key fobs and/or other devices of interest that may be used as an UWB initiator.

Referring more specifically to FIG. 1, the vehicle 102 may be any passenger or commercial automobile such as a car, a truck, a sport utility vehicle, a crossover, a van, a minivan, a taxi, a bus, etc. The vehicle 102 may include various types of automobile, crossover utility vehicle (CUV), sport utility vehicle (SUV), truck, recreational vehicle, motorcycle, boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle powered by one or more electric motors. As a further possibility, the vehicle 102 may be a hybrid electric vehicle powered by both an internal combustion engine and one or more electric motors, such as a series hybrid electric vehicle, a parallel hybrid electrical vehicle, or a parallel/series hybrid electric vehicle.

The UWB anchors 104 communicate wirelessly with the mobile device 108 using radio waves. The UWB anchors 104 use an ultra-wideband signal, e.g., a signal with a low energy level spread over a large range of the radio spectrum. The Federal Communications Commission and the International Telecommunications Union Radiocommunication Sector define ultra-wideband as an antenna transmission for which emitted signal bandwidth exceeds the lesser of 500 MHz or 20% of the arithmetic center frequency. The UWB anchors 104 may use any suitable modulation method, e.g., orthogonal frequency-division multiplexing (OFDM), phase-shift keying (PSK), pulse-position modulation (PPM), etc.

To enable robust user localization, the vehicle is equipped with UWB responders that are strategically positioned in the vehicle's interior and within the body structure to provide UWB network coverage of the environment in and around the vehicle, i.e., where the mobile device 108 of the user may be located. Depending on the physical design and shape of the vehicle 102, some of the UWB anchors 104 may be placed inside the body walls of the vehicle 102 (e.g., four respectively placed near or/at each corner of the vehicle's front and rear bumpers), center console (between the driver and passenger seats) and inside the roof (near the rear center).

As shown in the example of FIG. 1, the UWB anchors 104 include a first UWB anchor 104a, a second UWB anchor 104b, a third UWB anchor 104c, a fourth UWB anchor 104d, a fifth UWB anchor 104c, and a sixth UWB anchor 104f. The UWB anchors 104 are spaced apart from each other, e.g., spread over the vehicle 102, to increase the ability to distinguish a location when used for trilateration. For example, four of the UWB anchors 104 may be located at respective corners of the vehicle 102 to maximize the horizontal spread of the UWB anchors 104, and the remaining three UWB anchors 104 may be located internally to a footprint of the vehicle 102 at different heights than the corner-mounted UWB anchors 104 to provide a vertical spread.

The controller 106 may be a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The controller 106 can thus include a processor, a memory, etc. The memory of the controller 106 can include media for storing instructions executable by the processor as well as for electronically storing data and/or databases, and/or the controller 106 can include structures such as the foregoing by which programming is provided. The controller 106 can be multiple computers coupled together.

The controller 106 may transmit and receive data through a communications network such as a controller area network (CAN) bus, Ethernet, WiFi, Local Interconnect Network (LIN), onboard diagnostics connector (OBD-II), and/or by any other wired or wireless communications network. The controller 106 may be communicatively coupled to the UWB anchors 104 and other components via the communications network. The controller 106 may localize the position of the mobile device 108 using trilateration, based on the distance information collected between each of the UWB anchors 104 and the mobile device 108.

The UWB anchors 104 may communicate with at least one mobile device 108. The mobile devices 108 may include portable computing devices such as smart keyfobs; mobile phones, e.g., smartphones; wearable devices, e.g., smartwatches, headsets, etc.; or tablets. The mobile devices 108 are computing devices including respective processors and respective memories. The mobile devices 108 may be owned and carried by respective persons who may be operators and/or owners of the vehicle 102.

To perform the trilateration, a computation of the intersection of three or more circles (2D) or spheres (3D) may be performed. The UWB anchors 104 may be configured to transmit and receive signals (within signal power thresholds) over UWB channel frequencies (e.g., UWB channel 9 (7.737-8.236 GHZ) to Channel 5 (6.240-6.739 GHz) or other possible channels that are adopted by the UWB standard). Under ideal radio frequency (RF) conditions, e.g., when the mobile device 108 is located within the line of sight (LOS), three UWB anchors 104 may be sufficient in locating the mobile device 108, i.e., the initiator, and thereby enabling trilateration-based localization of the user through responder-to-initiator distance ranging. However, because of the possibility of less favorable RF conditions, data from more than three UWB anchors 104 may be utilized by the controller 106 to ensure there is adequate wireless UWB coverage to locate the mobile device 108.

It may be desirable to ensure that the mobile device 108 is automatically localized using the UWB anchors 104. Due potential RF signal impairments, the controller 106 may automatically perform a self-calibration of the UWB anchors 104 to mitigate user localization interruption. These self-calibrations include self-optimization, self-healing, and self-configuration. The UWB anchors 104 may report their RF parameters, such as transmit (Tx)/receive (Rx) frequency, power, etc. to the controller 106. The controller 106 may oversee the RF management of the network of UWB anchors 104, and may coordinate the self-optimization, self-healing, and self-configuration.

Figure 2:
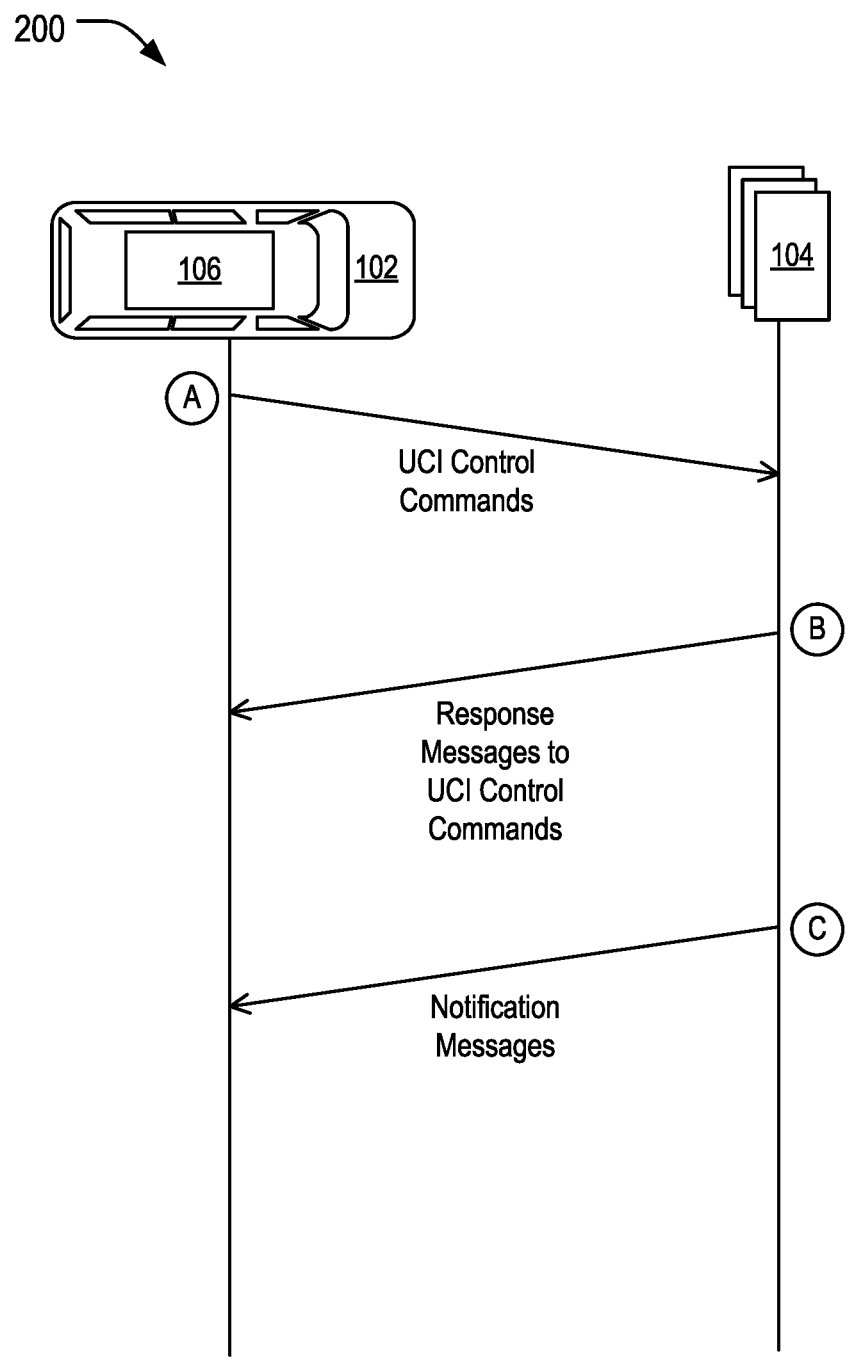
FIG. 2 illustrates an example data flow of a self-optimization performed by the vehicle.

FIG. 2 illustrates an example data flow 200 of a self-optimization performed by the vehicle 102. Self-optimization of the UWB anchors 104 may be performed by a new vehicle 102 as built, e.g., with new UWB anchors 104. Self-optimization refers to the autonomously configuration of the UWB anchors 104 to optimize UWB coverage, which in turn leads to improved user localization.

For instance, a new vehicle may be equipped with a plurality of UWB anchors 104 installed to certain positions in and around the vehicle 102. The controller 106 ensures that the UWB anchors 104 are optimized by autonomously setting RF parameters of the UWB anchors 104. These parameters may include, for example, ranging session identifier (ID), responder time slot index, ranging uncertainty or figure of merit (FOM), signal power, RF transmission frequency, ranging time interval, responder's antenna group delay, etc. The parameters may be set based on proximity of the UWB anchors 104 to each other, reported signal strength indicators, prior initiator localization error reports, etc. by autonomously sending a new/updated set of unified configuration interface (UCI) commands to the UWB anchors 104.

As shown at index (A), the controller 106 sends UCI commands to the UWB anchors 104. These commands may be sent from the controller 106 to the UWB anchors 104 via a UCI command interface (e.g., a universal serial bus (USB) cable, a CAN bus, etc.). The commands may be common across the UWB anchors 104 or may be individualized to the UWB anchors 104 to cause a specific UWB anchor 104 to carry out a specific task (e.g., reset the UWB anchor 104, reset antenna group delay, increase Tx power, reduce Tx power, use a specific RF transmission frequency, increase ranging report time interval, decrease ranging report time interval, etc.

As shown at index (B), the UWB anchors 104 send responses to the UCI commands back to the controller 106. These responses may be, for example, to indicate the changes or actions were performed (or not performed) by the UWB anchors 104 responsive to the received UCI commands. These responses may allow for the controller 106 to be apprised of the current status of the operation of the UWB anchors 104.

As shown at index (C), from time to time (such as responsive to detection of a mobile device 108), the UWB anchors 104 may also send notifications to the controller 106. These notifications may include additional information related to the received UCI commands (e.g., updates on the completion of an operation that was requested by the controller 106), or may be independent of the received UCI commands (e.g., a notification of a malfunction at the UWB anchor 104). Based on the received responses and/or notifications, the controller 106 may send additional UCI commands such as shown at index (A).

Turning to self-healing, self-healing is a mechanism whereby, if any of the existing UWB anchors 104 fails or becomes inoperative, the controller 106 automatically commands the remaining UWB anchors 104 to adjust their own network parameters (e.g., increase transmission power, change transmission frequency, etc.). This adjustment is performed to reduce the effect of the failure and provide necessary UWB coverage to enable localization in the area previously served by the failed UWB anchor(s) 104 while at the same time mitigating interference between the neighboring UWB anchors 104. Self-healing of the UWB network of the vehicle 102 may be performed responsive to detection that one or more of its existing UWB anchors 104 has been damaged.

The UCI commands that allow the controller 106 to configure the UWB anchors 104 may rely the number of available UWB anchors 104. In an example, the controller 106 may send UCI commands that match the number of the remaining UWB anchors 104 to assign the UWB anchors 104 to responder time slot indexes to correct for some of the UWB anchors 104 having been damaged. The controller 106 may also send commands including other RF parameter control commands to adjust other aspects of the operation of the remaining UWB anchors 104, such as RF frequency, Tx power, etc.

Figure 3:
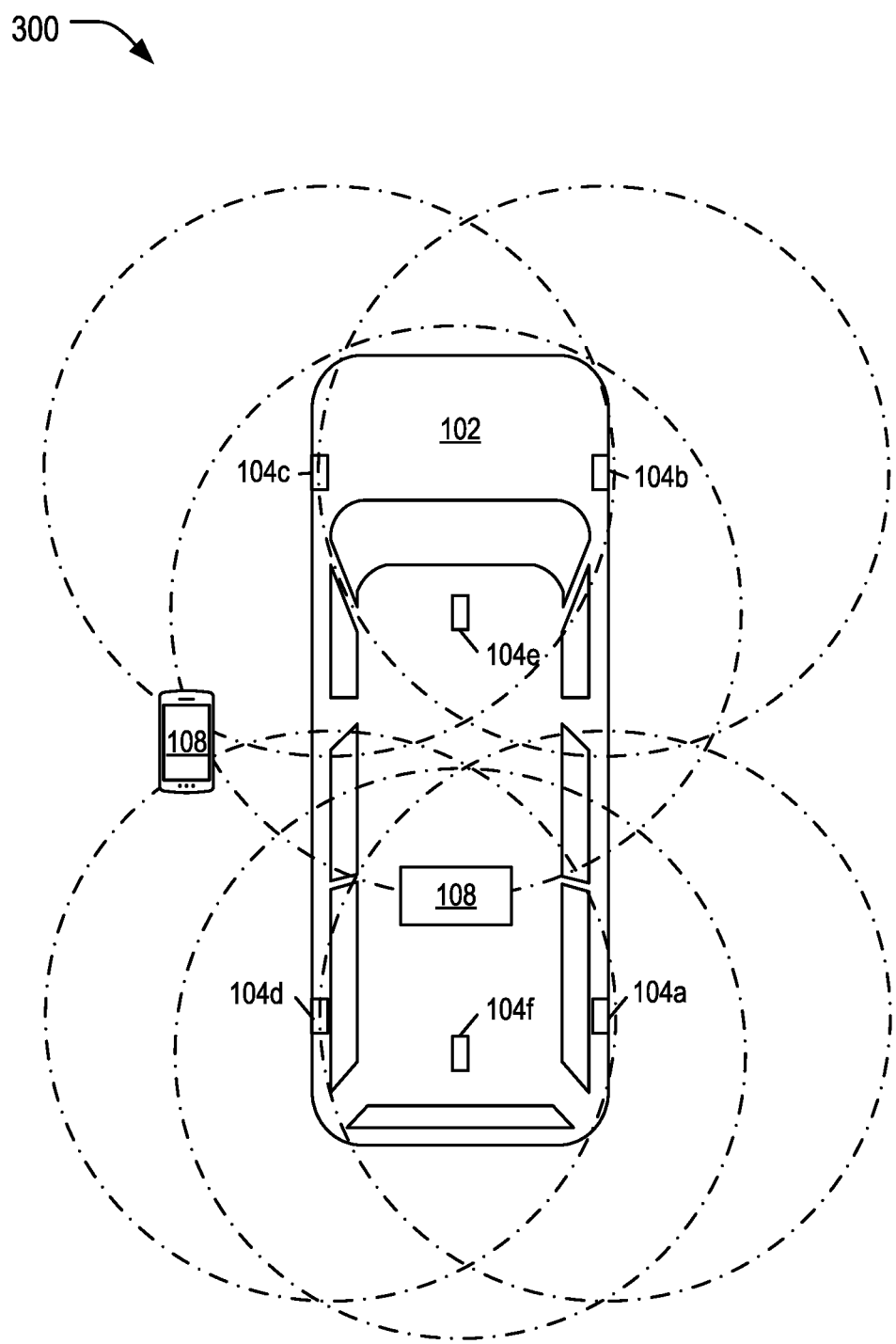
FIG. 3 illustrates an example of the vehicle in which all of the UWB anchors are operating correctly.
Figure 4:
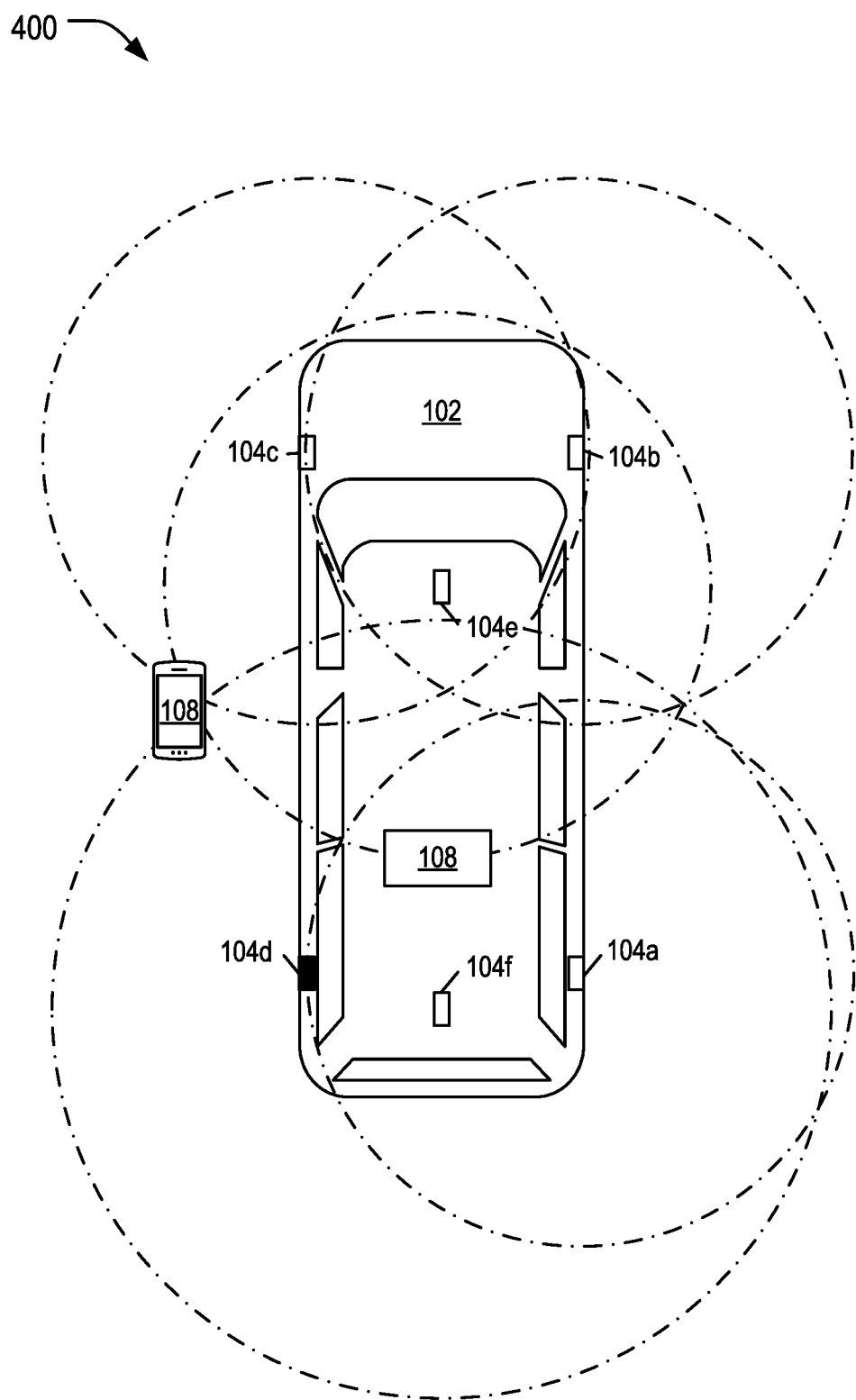
FIG. 4 illustrates an example of the vehicle in which one of the UWB anchors has failed and another of the UWB anchors has been adjusted to compensate.
Figure 5:
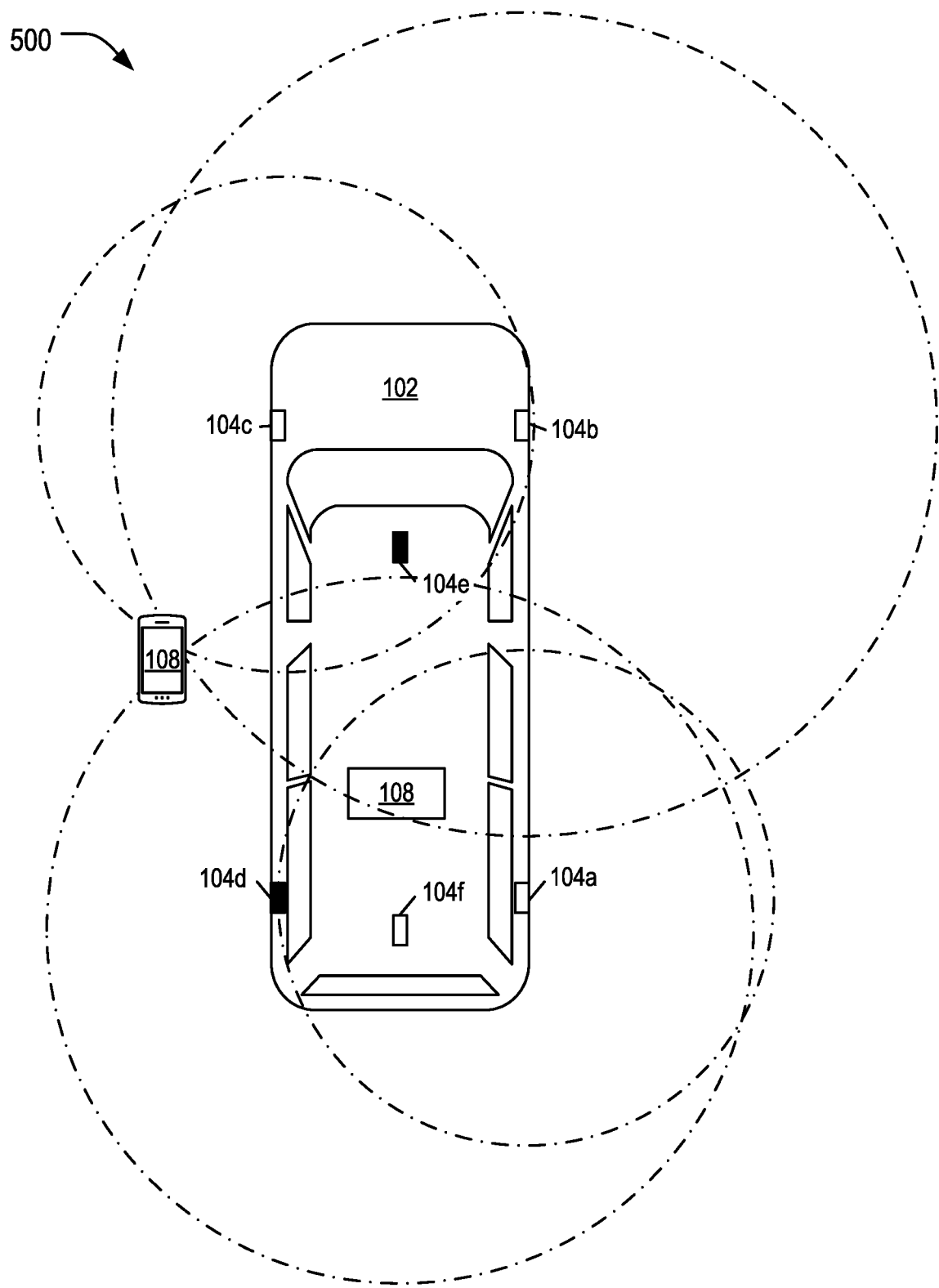
FIG. 5 illustrates an example of the vehicle in which a second of the UWB anchors has failed and another of the UWB anchors has been adjusted to further compensate.

FIGS. 3-5 collectively illustrate examples of the self-healing capabilities of the system 100. More specifically, FIG. 3 illustrates an example 300 of the vehicle 102 in which all of the UWB anchors 104 are operating correctly. FIG. 4 illustrates an example 400 of the vehicle 102 in which the UWB anchor 104*d* has failed and the UWB anchor 104*f* has been adjusted to compensate. FIG. 5 illustrates an example 500 of the vehicle 102 in which the UWB anchor 104*c* has also failed and the UWB anchor 104*b* has been adjusted to further compensate.

As shown in FIG. 3, each of the UWB anchors 104*a-f* is set by the controller 106 to operate at substantially the same Tx power. This may be accomplished using the data flow 200 in an example. As further shown, the mobile device 108 is being detected by the closest of the UWB anchors 104. These include UWB anchors 104*c*, 104*d*, and 104*c*.

As shown in FIG. 4, the UWB anchor 104*d* has failed. This may have occurred, for example due to the vehicle 102 having an issue at the rear left fender. The controller 106 may determine that the UWB anchor 104*d* is inoperative using various techniques. For instance, the controller 106 may assume the UWB anchor 104*d* is damaged responsive to no longer receiving data from the UWB anchor 104*d*. Responsive to detecting an issue with the UWB anchor 104*d*, the controller 106 may adjust the parameters of one or more of the remaining UWB anchors 104 to mitigate the issue. As shown, the controller 106 has sent a UCI command to UWB anchor 104*f* to increase its Tx power and range (and potentially also change its frequency of operation to avoid interference with the other UWB anchors 104).

By doing so, the mobile device 108 may still be located at its position as shown in FIGS. 3 and 4, despite the malfunction of one of the UWB anchors 104*d* that was previously locating the mobile device 108. Instead, the UWB anchor 104 may be utilized to ensure that there are at least three UWB anchors 104 to triangulate the mobile device 108. Thus, the self-healed and self-optimized network of the remaining UWB anchors 104 may continue to provide UWB network coverage to enable localization of the mobile device 108.

As shown in FIG. 5, the UWB anchor 104*e* has also failed. To address this, the controller 106 has automatically sent a command to request the UWB anchor 104*b* to increase its Tx power and range (and perhaps change frequency to avoid interference with the other UWB anchors 104). Once again, these adjustments allow for the continued location of mobile devices 108, despite the reduced count of available UWB anchors 104.

Turning to self-configuration, self-configuration is a mechanism whereby new wireless UWB anchors 104 may be installed and activated, and the controller 106 may automatically sends UCI commands to the new and existing UWB anchors 104 to autonomously configure the revised network. These UCI commands may direct the UWB anchors 104 to adjust their own key network parameters (e.g., reduce transmission power, change the transmission frequency, assign new responder time slot index, change the time interval of transmission per device, etc.) in order to provide improved UWB network coverage (as a result of new UWB anchor 104 being available). Thereby the controller 106 may enable better user mobile device 108 localization while at the same time mitigating interference between neighboring UWB anchors 104, including the newly introduced UWB anchor 104.

The self-configuration may be performed, for example, responsive to detection of new UWB anchor 104 signals by the controller 106, e.g., responsive to one or more of new replacement UWB anchors 104 being installed to replace one or more inoperative UWB anchors 104.

Figure 6:
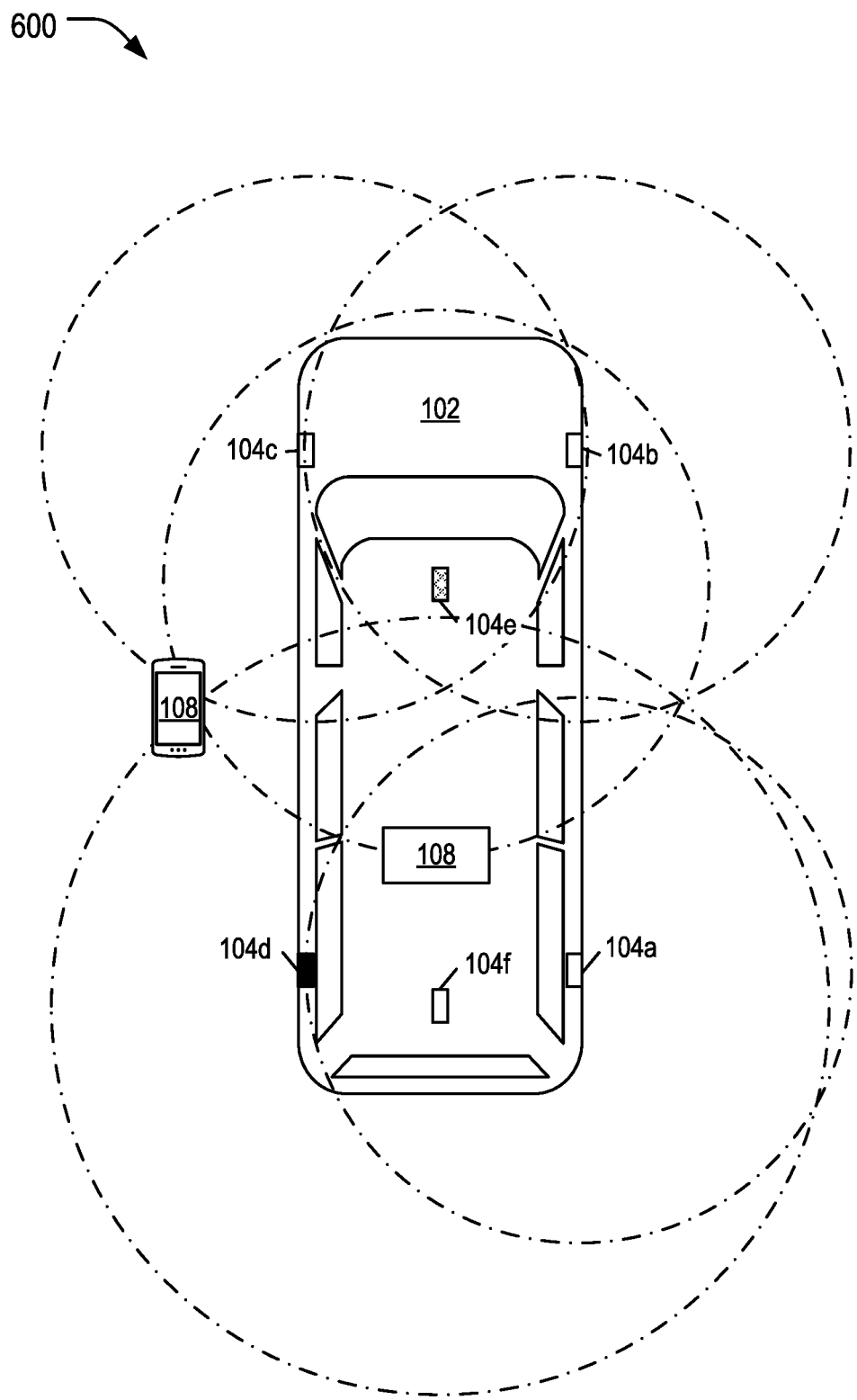
FIG. 6 illustrates an example of the vehicle in which one of the failed UWB anchors is replaced.
Figure 7:
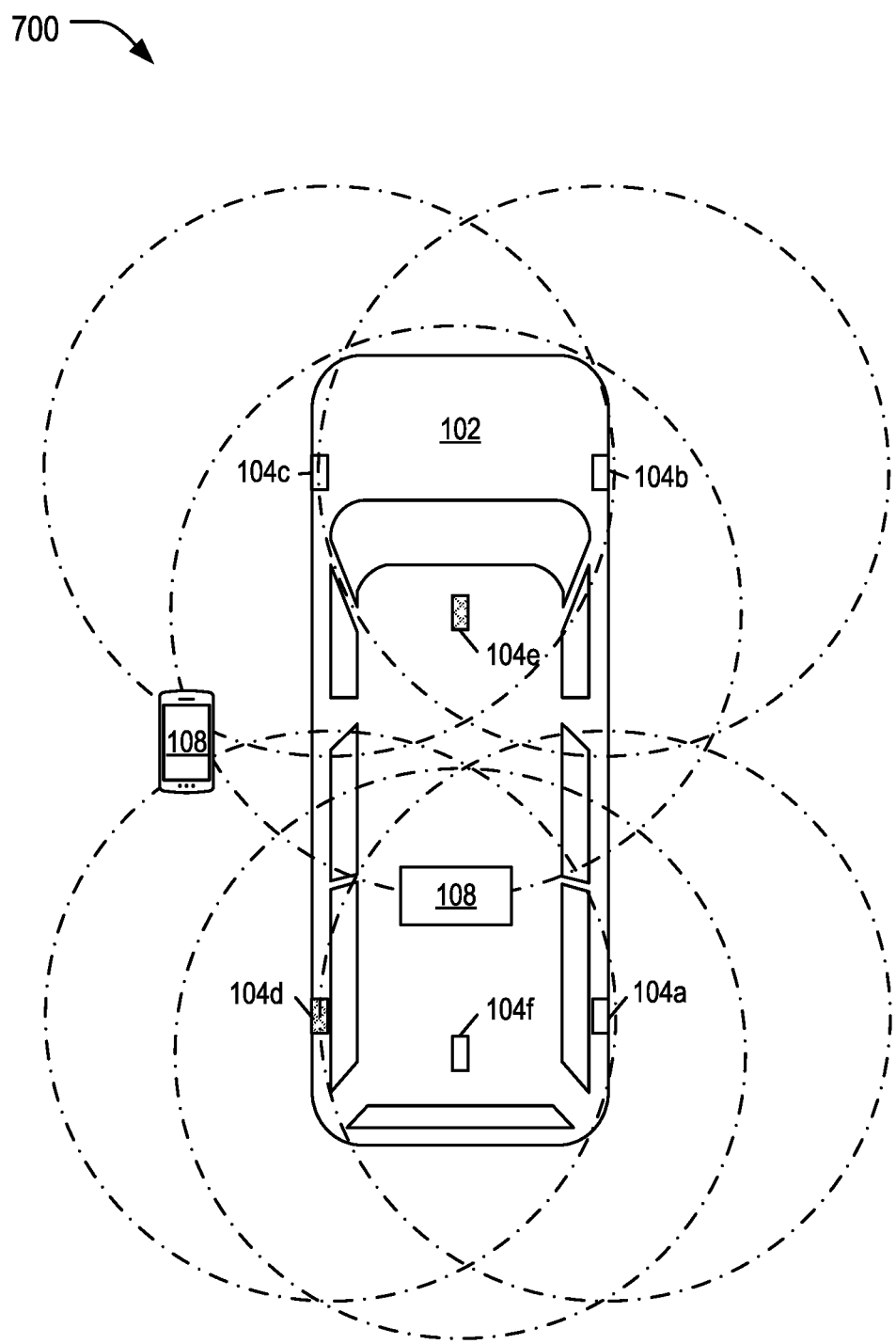
FIG. 7 illustrates an example of the vehicle in which the second of the UWB anchors is also replaced.

FIGS. 6-7 collectively illustrate examples of the self-configuration capabilities of the system 100. More specifically, FIG. 6 illustrates an example 600 of the vehicle 102 in which the failed UWB anchor 104d is replaced. FIG. 7 illustrates an example 700 of the vehicle 102 in which the UWB anchor 104e is also replaced.

As shown in FIG. 6, a new UWB anchor 104e has been installed. This may have been done by the user or a dealer or a mechanic, as some examples. The controller 106 may determine that a new UWB anchor 104e is present using various techniques. For instance, the controller 106 may receive signals from the new UWB anchor 104e after having not been receiving data from the old UWB anchor 104c.

Responsive to detecting the new UWB anchor 104c, the controller 106 may configure the new UWB anchor 104e and may adjust the parameters of one or more of the other UWB anchors 104 to integrate the new UWB anchor 104c. As shown, the controller 106 has sent a UCI command to UWB anchor 104b to return its Tx power and range back to a smaller range consistent with operation of the other UWB anchors 104. However, the operation of the UWB anchor 104f may remain in the increased Tx mode. The controller 106 may also potentially send UCI commands to change the frequency of operation of one or more of the UWB anchors 104, which now have less overlap with one another and should be able to use greater overlap of spectrum than with the larger Tx power as before.

As shown in FIG. 7, the UWB anchor 104d has also been replaced. To address this, the controller 106 has automatically sent a command to request the UWB anchor 104f to return its Tx power and range (and perhaps change back its frequency). Once again, these adjustments allow for the continued location of mobile devices 108, with the addition of the replacement UWB anchors 104. Thus, the controller 106 now adjusted the Tx/Rx parameters for all UWB anchors 104 on the vehicle 102 for optimal localization, restoring the UWB network to the original self-optimized network parameters.

In one form of application, autonomous calibration of on-vehicle UWB anchors 104 may be performed in order to enhance mobile device 108 localization coverage. To do so, a probabilistic algorithm may be utilized to manage the UWB network coverage in a self-calibrating manner. More specifically, let $S^{A_i,t}=(S_1^{A_i,t}, S_2^{A_i,t}, \ldots, S_m^{A_i,t})$ be a state vector of length n whose elements represent UWB anchor 104 status and ranging quality indicators, where $A_i$ refers to the $i^{th}$ one of the UWB anchor 104. Let the state elements refer to various potential configurable elements (e.g., ranging session ID, responder time slot index, ranging uncertainty or figure of merit (FOM), signal power, RF transmission frequency, ranging time interval, responder's antenna group delay, etc.). These elements may be detected or measured for a given anchor $A_i$ placed in position i (for i=1, 2, . . . , N, where N is the total number of anchors) and/or inside the vehicle 102 at time t and reported to the controller 106. Accordingly, the vector $S^{A_i,t}$ represents the current state (i.e., state at time t) for anchor $A_i$.

The algorithm may utilize an assumption that all state vectors $S^{A_i,1}, S^{A_i,2}, \ldots, S^{A_i,t}, S^{A_i,t+1}$ satisfy the Markov Decision Process (MDP). More specifically, the state vectors may be assumed to satisfy the property that, given all the prior t state vectors $S^{A_i,1}, S^{A_i,2}, \ldots, S^{A_i,t}$, the conditional probability of the next state $S^{A_i,t+1}$ depends only on the current state $S^{A_i,t}$, and thus is independent of all the other t−1 previous states. Mathematically: $P(S^{A_i,t+1}|S^{A_i,t}, S^{A_i,t-1}, \ldots, S^{A_i,1})=P(S^{A_i,t+1}|S^{A_i,t})$. The formulated MDP problem may then be solved using reinforcement learning algorithms as Q-learning.

For example, the reinforcement learning algorithm may be carried out by the controller 106 to inform the controller 106 which corrective actions to take. The action may include sending the UCI commands to one or more of the UWB anchors 104 (e.g., $A^i$ placed in position i of the 1, . . . , N of the UWB anchors 104). These commands may be configured to adjust the configuration of the UWB anchors 104, e.g., to increase or reduce transmission power, change RF transmission frequency, assign a new time slot index, increase or reduce frequency of ranging time, etc. The specific commands may be based on rewards gained or lost (e.g., observed localization accuracy gain or loss based on prior anchor parameters) from taking analogous actions while moving from a certain state to the next.

The reinforcement learning may be performed to implement RF parameter tuning, e.g., adjusting Tx power, Tx frequency, etc., within various constraints. For instance, the transmission power may be adjusted while staying within standards of course. For example, the Federal Communications Commission (FCC) requires that UWB anchors 104 not exceed a Tx power of −41.3 dBm. The UWB anchor 104 received power levels may be found in practice to be between −80 dBm and −108 dBm. Depending upon the Tx power, there may be configuration room to increase Tx power when desired to stay within the limits required by the FCC standards to avoid interference. It should be noted that these RF parameters of the UWB anchors 104 may involve two-way communication. Yet, it is not a requirement that if the UWB anchors 104 increases power then the mobile device 108 also raises its Tx power. It should also be noted that power is not the only parameter that can be tuned. For example, there are scenarios where the mobile device 108 operate at channel 5 instead of channel 9, and the RF parameters specified by UCI commands may allow the UWB anchors 104 to be switched to a different channel. It should also be noted that some features may require frequencies of transmission other than the every 96 ms as recommended by the Car Connectivity Consortium (CCC); e.g., some features may utilize a higher rate or a lower rate, e.g., tool tracking, vs. open on approach, vs. baby-left-in-vehicle detection, etc.

This informed decision based on analogous actions may be defined as a policy for configuration of the UWB anchors 104. It should be noted that, for example the Q-learning algorithm may learn an optimal policy that maximizes expected value of the total reward over all successive steps starting from the current state.

More specifically, consider a set of all possible states $\{S^{A_i,1}, S^{A_i,2}, \ldots, S^{A_i,t}, S^{A_i,t+1}\}$ that a given UWB anchor $A_i$ can be in. Let $a=\{a_1, a_2, \ldots, a_k\}$ be the set of all actions that can be taken by the computing agent (e.g., controller), one each. Moreover, suppose that (e.g., in order to optimize the UWB network), an agent wants to tune a given anchor $A_i$ from a given state $S^{A_i,t}$ to some goal state or desired state $S^{A_i,t'''}$, where t and t''' belong to the set $\{1, 2, \ldots, t+1\}$ of all state indexes. To this end, the agent could find the optimal state path by repeatedly (or iteratively) carrying out a maximization (max) computations of the following form: $\hat{Q}(S^{A_i,t}, a) = R(S^{A_i,t}, a) + \gamma \max_a \hat{Q}(S^{A_i,t'}, a')$, where $R(S^{A_i,t}, a)$, an element of a t+1 by K matrix R, represents a reward for taking action a to go from the state to a neighboring state $S^{A_i,t'}$. In this equation, $\gamma$ represents an predetermined optimization constant (also known as a learning rate, which may be empirically set by a engineer or system designer). Q is a t+1 by K matrix whose entries are determined from the above Q-function (or value function). Q can be initialized by zero entries and then get updated as computations to go from state to state are iteratively obtained. The maximization is done over all possible actions (represented by the element a' of the set a).

The coordinates of the UWB anchors 104 relative to the vehicle 102, and the dimensions (i.e., length, width, height) of the vehicle 102 may be known a priori and embedded (or otherwise coded) into the algorithm. The UWB network may then be calibrated and/or optimized based on the physical positions of the UWB anchors 104 by using the aforementioned approach of self-calibration. By doing so, various capabilities and operations are enabled.

In an example, due to physical limitations and perhaps due to a strategic decision to avoid potential metallic blockades of its signals, a given UWB anchors 104 may be required to be installed in a given position on the vehicle 102 (some dedicated slot of sorts). This may be a predefined position on the vehicle 102 with predefined and/or precomputed separation distance to the other UWB anchors 104 on the vehicle 102. In one example of the current disclosure under operation, once a new UWB anchor 104 is placed there (i.e., the replacement UWB anchor 104), its position on or inside vehicle body would relatively be known to the controller 106. In more complex scenarios, the controller 106 may send UCI commands to any newly installed anchor to temporality designate it as an initiator. The UWB anchors 104 may then carry out trilateration to find the precise location of the new UWB anchor 104 (using the existing UWB anchors 104). This location, whether computed or determined may be saved to the on-vehicle position information for the UWB anchors 104 of the vehicle 102. Once compete, the controller 106 may designate the new UWB anchor 104 as an UWB anchor 104 to be used (e.g., via UCI commands) in order to resume regular user localization or other desired operation.

In an example, autonomous ranging capabilities may be enabled. This ranging may be between the mobile device 108 and a single one of the UWB anchors 104 of the vehicle 102. The ranging may occur happens at predefined time intervals commanded by the controller 106 via the UCI commands. The outcome of the ranging, as computed using the time of flight of the signal between the mobile device 108 and the UWB anchor 104, is to report a distance between the mobile device 108 and the UWB anchor 104. This distance from the UWB anchor 104 may be considered as a radius with the UWB anchor 104 at the origin and the mobile device 108 at the edge of the sphere generated by the radius. In many examples, an initial handshake between the mobile device 108 and the on-vehicle UWB network (as a precursor authentication step to anchor-initiator ranging) is performed handled by the presence of a single Bluetooth Low Energy (BLE) module both in the vehicle 102 (perhaps controlled by the controller 106) and in the mobile device 108.

In another example, autonomous localization capabilities may be enabled. The localization of the mobile device 108 may be performed by the computation of an intersection of at least three ranging circles (2D) or spheres (3D), i.e., with three or more separate UWB anchors 104 as origins. The intersection computation procedure may be referred to as trilateration and may provide the location of the mobile device 108 by solving the (x, y, z) coordinates. Here (x, y) may represents plane projected to or parallel to the ground, with z representing the vertical plane or height.

In yet another example, access to and/or operation of the vehicle 102 capabilities may be enabled. Having the coordinates of the UWB anchors 104 along with the dimensions of the vehicle 102 allows the controller 106 to create zones in and around the vehicle 102 that can enable vehicle 102 access or operation depending on whether or not the mobile device 108 is located. For instance, responsive to the mobile device 108 being located outside of and a few meters from the vehicle 102, the controller 106 may invoke automatic communicative lighting or external vehicle speaker alerts. Or, responsive to the mobile device 108 being located near the driver door, the controller 106 may automatically unlock that door to the vehicle 102 as user approaches the vehicle 102. Or, responsive to the mobile device 108 being located near the tailgate or liftgate, the controller 106 may automatically enable the lower tailgate or lift the liftgate as the user approaches the vehicle 102). Or, responsive to the mobile device 108 being located in the driver seat the controller 106 may enable operation of the push-to-start button etc.

In still another example, autonomous UWB localization coverage enhancement capabilities may be enabled. The vehicle 102 utilizing the mobile device 108 as an initiator may rely on the ability of the in-vehicle UWB network to locate the mobile device 108 and therefore localizing the user. However, if one or more UWB anchors 104 stop functioning (e.g., as discussed above), the ability of the user to operate the vehicle 102 using localization (e.g., unlock door, start vehicle, open vehicle, etc.) may no longer be available. The self-calibrating capabilities may allow for the reconfiguration of the UWB anchors 104, preserving the UWB network functionality of the vehicle 102.

As another example, autonomous RF interference avoidance or capabilities may be enabled. For instance, the controller 106 may use the UWB anchors 104 to sense localization inaccuracies or excess radio interference. These inaccuracies and/or interference may result from interference from the surrounding environment, such as resulting from use of other radio accesses technology (RAT) devices, e.g., Wi-Fi, microwave, etc.). To address these inaccuracies, the controller 106 may automatically trigger an RF channel change (e.g., from channel 9 (7.737-8.236 GHz) to channel 5 (6.240-6.739 GHz) or vice versa) by sending UCI commands to reconfigure the UWB anchors 104.

In yet another example, vehicle 102 assembly efficiencies capabilities may be enabled. For instance, various vehicles 102 may be built in in different shapes sizes, and configurations (e.g., sedan, couple, convertible, carbon fiber vs metal components, etc.). As a result of this variation, the vehicles 102 may require UWB RF network tuning and calibration, for each vehicle type and/or material. This configuration may be automatically performed using the controller 106. In still another example, technical expertise and labor to install and configure each UWB anchor 104 may be mitigated by the automatic functioning of the controller 106.

Figure 8:
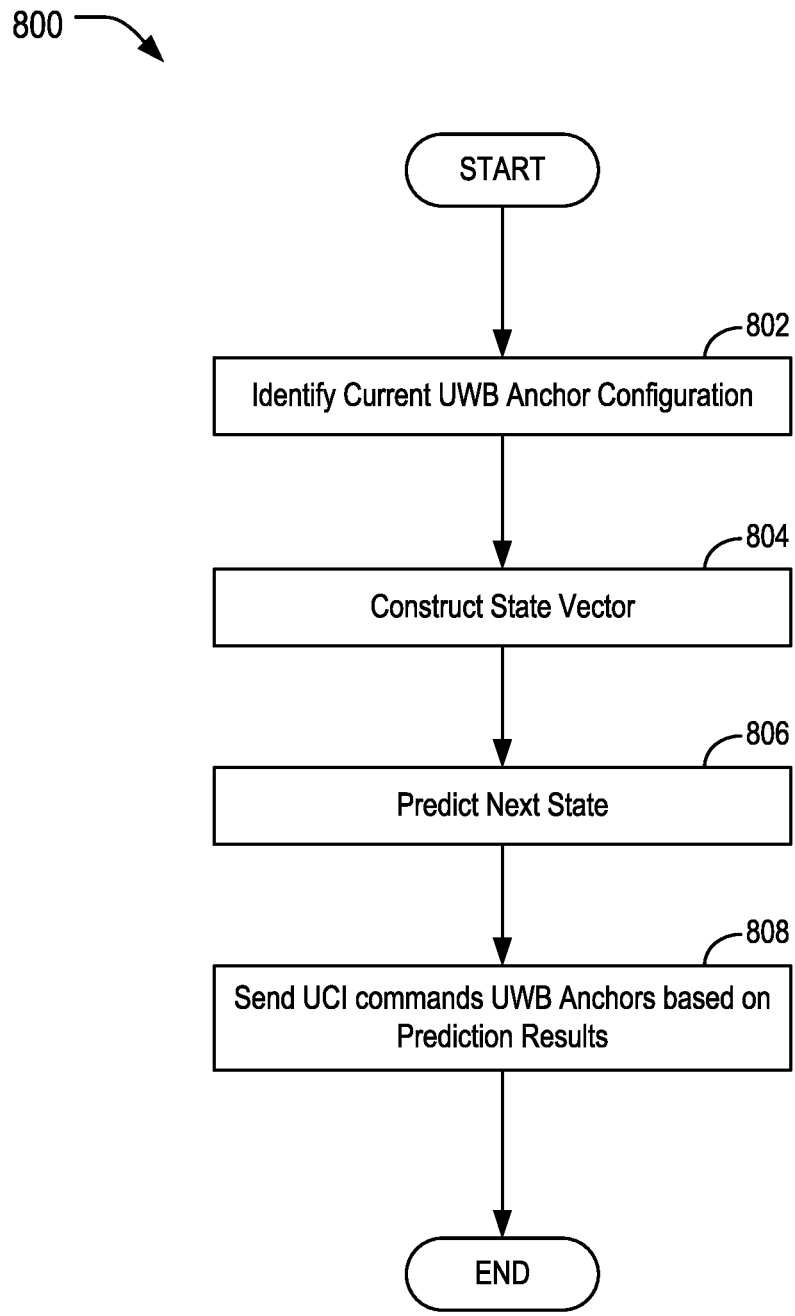
FIG. 8 illustrates an example process for implementing the self-optimization of the on-vehicle UWB anchors.

FIG. 8 illustrates an example process 800 for implementing the self-optimization of the on-vehicle UWB anchors 104. In an example, the process 800 may be performed using the controller 106 in the context of the system 100.

At operation 802, the controller 106 identifies a current configuration of the UWB anchors 104. For instance, the vehicle 102 may be equipped with a plurality of UWB anchors 104 installed to certain positions in and around the vehicle 102. The controller 106 may send UCI control commands to the UWB anchors 104 to identify the presence of UWB anchors 104. This information may include, as some non-limiting examples, identifiers, locations, current RF properties, etc. of the UWB anchors 104.

At operation 804, the controller 106 constructs state vectors for the received parameters. In an example, let $S^{A_i,t}=(S_1^{A_i,t}, S_2^{A_i,t}, \ldots, S_n^{A_i,t})$ be a state vector of length n whose elements represent UWB anchor 104 status and ranging quality indicators, where $A_i$ refers to the $i^{th}$ one of the UWB anchor 104. The state elements may refer to various potential configurable elements (e.g., ranging session ID, responder time slot index, ranging uncertainty or (FOM, signal power, RF transmission frequency, ranging time interval, respond antenna group delay, etc.). These elements may be detected or measured for a given anchor $A_i$ placed in position i (for i=1, 2, . . . , N, where N is the total number of anchors) and/or inside the vehicle 102 at time t and reported to the controller 106.

At operation 806, the controller 106 uses reinforcement learning using the state vectors to predict a next state. In an example, the reinforcement learning algorithm may be carried out by the controller 106 to inform the controller 106 which corrective actions to take. As illustrated above via the summary of the Q-learning algorithm, for each UWB anchor 104, there is a limited number of states (or state vectors) and a limited number of associated actions. Once the computations have been finished and the Q-function matrix has been fully updated and populated with computed values, the controller 106 is able to compare the values of the matrix rows to determine the optimal path. In other words, the controller 106 iteratively determines the best path/route (out of all possible paths) to follow from the starting state to the goal state or desired state, i.e., optimizing the network. For example, an iterative path could be that where all the other values of the state vector are kept constant while incrementally increasing the power from state to state until desired network conditions are met.

For example, self-optimization may be performed for a new vehicle 102 to ensure the RF parameters (e.g., Tx power, frequency of transmission, etc.) for each UWB anchor 104 are tuned based on their relative physical proximity, etc. In another example, self-healing may be performed if any of the UWB anchors 104 have stopped operating. In yet another example, self-configuration may be performed responsive to the addition of new UWB anchors 104.

At operation 808, the controller 106 sends UCI commands to the UWB anchors 104 based on the result of the MDP. This may include sending the UCI commands to one or more of the UWB anchors 104 (e.g., $A^i$ placed in position i of the 1, . . . , N of the UWB anchors 104). These commands may be configured to adjust the configuration of the UWB anchors 104, e.g., to increase or reduce transmission power, change RF transmission frequency, assign a new time slot index, increase or reduce frequency of ranging time, etc. The specific commands may be based on rewards gained or lost (e.g., observed localization accuracy gain or loss based on prior anchor parameters) from taking analogous actions while moving from a certain state to the next.

Figure 9:
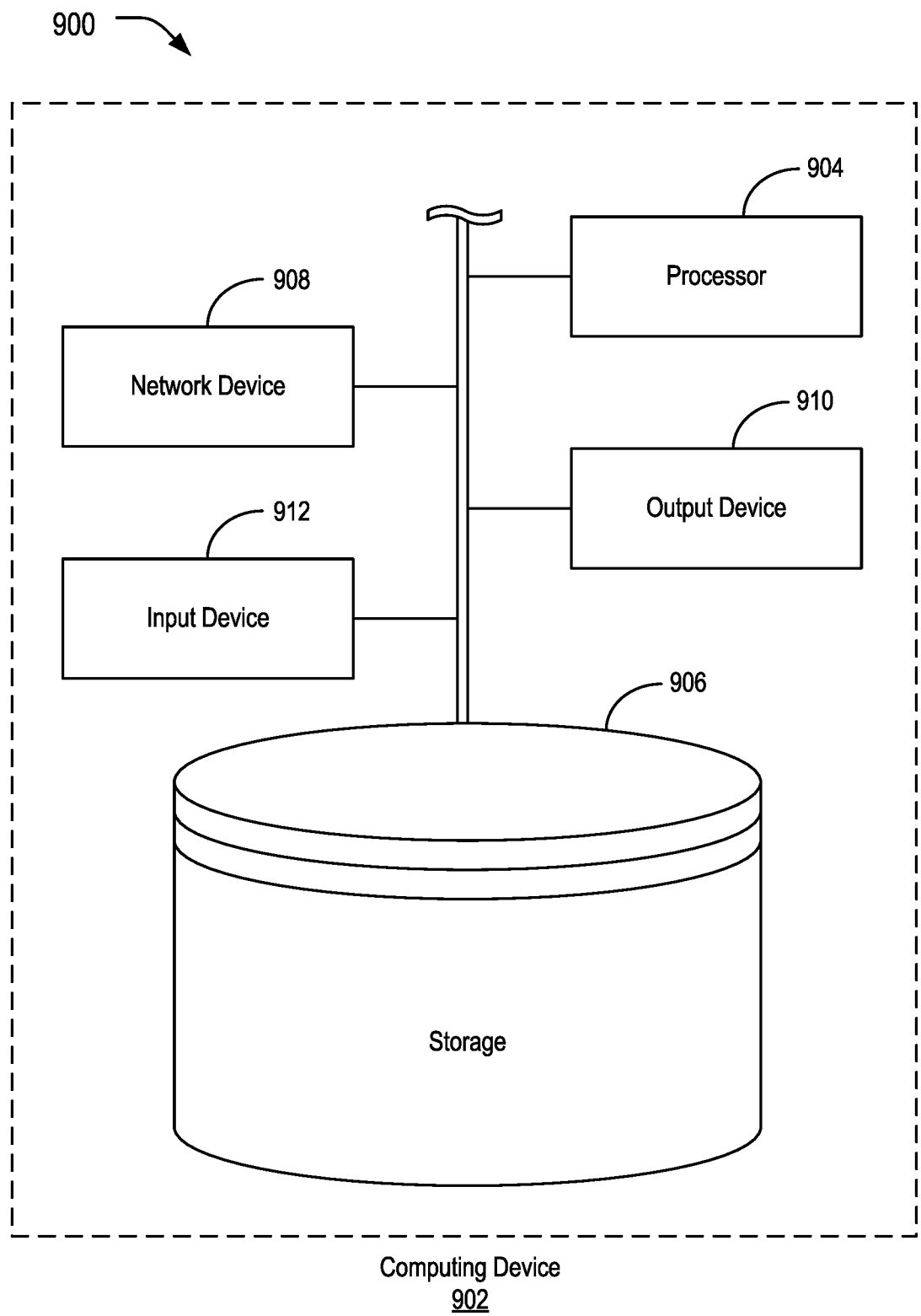
FIG. 9 illustrates an example computing device for implementing the self-optimization of the on-vehicle UWB anchors.

FIG. 9 illustrates an example computing device 902 for implementing the self-optimization of the on-vehicle UWB anchors 104. Referring to FIG. 9, and with reference to FIGS. 1-8, the vehicle 102, UWB anchors 104, controller 106, and mobile device 108 may be examples of such computing devices 902. Computing devices 902 generally include computer-executable instructions, where the instructions may be executable by one or more computing devices 902. Computer-executable instructions may be compiled or interpreted from computer programs created using a variety of programming languages and/or technologies, including, without limitation, and either alone or in combination, Java™, C, C++, C #, Visual Basic, JavaScript, Python, JavaScript, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data, such as UCI commands, responses, notifications, UWB anchors 104 locations, state vector, etc., may be stored and transmitted using a variety of computer-readable media.

As shown, the computing device 902 may include a processor 904 that is operatively connected to a storage 906, a network device 908, an output device 910, and an input device 912. It should be noted that this is merely an example, and computing devices 902 with more, fewer, or different components may be used.

The processor 904 may include one or more integrated circuits that implement the functionality of a central processing unit (CPU) and/or graphics processing unit (GPU). In some examples, the processors 904 are a system on a chip (SoC) that integrates the functionality of the CPU and GPU. The SoC may optionally include other components such as, for example, the storage 906 and the network device 908 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 904 executes stored program instructions that are retrieved from the storage 906. The stored program instructions, accordingly, include software that controls the operation of the processors 904 to perform the operations described herein. The storage 906 may include both non-volatile memory and volatile memory devices. The non-volatile memory includes solid-state memories, such as Not AND (NAND) flash memory, magnetic and optical storage media, or any other suitable data storage device that retains data when the system is deactivated or loses electrical power. The volatile memory includes static and dynamic random access memory (RAM) that stores program instructions and data during operation of the system 100.

The GPU may include hardware and software for display of at least two-dimensional (2D) and optionally three-dimensional (3D) graphics to the output device 910. The output device 910 may include a graphical or visual display device, such as an electronic display screen, projector, printer, or any other suitable device that reproduces a graphical display. As another example, the output device 910 may include an audio device, such as a loudspeaker or headphone. As yet a further example, the output device 910 may include a tactile device, such as a mechanically raiseable device that may, in an example, be configured to display braille or another physical output that may be touched to provide information to a user.

The input device 912 may include any of various devices that enable the computing device 902 to receive control input from users. Examples of suitable input devices 912 that receive human interface inputs may include keyboards, mice, trackballs, touchscreens, microphones, graphics tablets, and the like.

The network devices 908 may each include any of various devices that enable the described components to send and/or receive data from external devices over networks. Examples of suitable network devices 908 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for performing self-optimization of an ultra-wideband (UWB) network, comprising:
    identifying a configuration of UWB anchors of a vehicle;
    constructing a state vector based on the identified configuration, the state vector including values for status and ranging quality indicators for each of the UWB anchors;
    predicting a next state based on the state vector using reinforcement learning to optimize UWB coverage, wherein a conditional probability of the next state depends only on the state vector; and
    sending unified configuration interface (UCI) commands to the UWB anchors to reconfigure the UWB anchors based on the predicted next state.

2. The method of claim 1, wherein the configuration of the UWB anchors includes locations with respect to the vehicle and operational status of the UWB anchors.

3. The method of claim 1, wherein the next state is predicted using a Q-learning algorithm that learns an optimal policy maximizing expected value of a total reward over successive steps starting from a current state.

4. The method of claim 1, wherein the UCI commands are configured to cause the UWB anchors to one or more of increase radio frequency (RF) transmission power, reduce RF transmission power, change RF transmission frequency, assign a new time slot index, increase ranging time, or decrease ranging time.

5. The method of claim 1, wherein the configuration is an initial configuration of the vehicle as built.

6. The method of claim 1, wherein the configuration indicates one or more of the UWB anchors have become inoperative, and the self-optimization includes self-healing to command the remaining UWB anchors to adjust network parameters to reduce an effect of the inoperative UWB anchors.

7. The method of claim 1, wherein the configuration indicates one or more of the UWB anchors have been added, and the self-optimization includes self-configuration to command the UWB anchors to adjust network parameters to mitigate interference between neighboring UWB anchors.

8. A system for performing self-optimization of an ultra-wideband (UWB) network, comprising:
    one or more computing devices configured to:
        identify a configuration of UWB anchors of a vehicle;
        construct a state vector based on the identified configuration, the state vector including values for status and ranging quality indicators for each of the UWB anchors;
        predict a next state based on the state vector using reinforcement learning to optimize UWB coverage, wherein a conditional probability of the next state depends only on the state vector; and send unified configuration interface (UCI) commands to the UWB anchors to reconfigure the UWB anchors based on the predicted next state.

9. The system of claim 8, wherein the configuration of the UWB anchors includes the locations and operational status of the UWB anchors.

10. The system of claim 8, wherein the next state is predicted using a Q-learning algorithm that learns an optimal policy maximizing expected value of a total reward over successive steps starting from a current state.

11. The system of claim 8, wherein the UCI commands are configured to cause the UWB anchors to one or more of increase transmission power, reduce transmission power, change RF transmission frequency, assign a new time slot index, increase ranging time, or decrease ranging time.

12. The system of claim 8, wherein the configuration is an initial configuration of the vehicle as built.

13. The system of claim 8, wherein the configuration indicates one or more of the UWB anchors have become inoperative, and the self-optimization includes self-healing to command the remaining UWB anchors to adjust network parameters to reduce an effect of the inoperative UWB anchors.

14. The system of claim 8, wherein the configuration indicates one or more of the UWB anchors have been added, and the self-optimization includes self-configuration to command the UWB anchors to adjust network parameters to mitigate interference between neighboring UWB anchors.

15. A non-transitory computer-readable medium comprising instructions for performing self-optimization of an ultra-wideband (UWB) network that, when executed by one or more computing devices, cause the one or more computing devices to perform operations including to:
identify a configuration of UWB anchors of a vehicle;
construct a state vector based on the identified configuration, the state vector including values for status and ranging quality indicators for each of the UWB anchors;
predict a next state based on the state vector using reinforcement learning to optimize UWB coverage, wherein a conditional probability of the next state depends only on the state vector; and
send unified configuration interface (UCI) commands to the UWB anchors to reconfigure the UWB anchors based on the predicted next state.

16. The non-transitory computer-readable medium of claim 15, wherein the configuration of the UWB anchors includes the locations and operational status of the UWB anchors.

17. The non-transitory computer-readable medium claim 15, wherein the next state is predicted using a Q-algorithm that learns an optimal policy maximizing expected value of a total reward over successive steps starting from a current state.

18. The non-transitory computer-readable medium of claim 15, wherein the UCI commands are configured tocause the UWB anchors to one or more of increase transmission power, reduce transmission power, change RF transmission frequency, assign a new time slot index, increase ranging time, or decrease ranging time.

19. The non-transitory computer-readable medium of claim 15, wherein the configuration is an initial configuration of the vehicle as built.

20. The non-transitory computer-readable medium of claim 15, wherein one or more of:
the configuration indicates one or more of the UWB anchors have become inoperative, and the self-optimization includes self-healing to command the remaining UWB anchors to adjust network parameters to reduce an effect of the inoperative UWB anchors; and
the configuration indicates one or more of the UWB anchors have been added, and the self-optimization includes self-configuration to command the UWB anchors to adjust network parameters to mitigate interference between neighboring UWB anchors.

* * * * *